United States Patent [19]

Mansson

[11] Patent Number: 5,238,332
[45] Date of Patent: Aug. 24, 1993

[54] DEVICE FOR HANDLING OF BULK MATERIAL

[75] Inventor: Tore Mansson, Bunkeflostrand, Sweden

[73] Assignee: Aumund Forderebau GmbH Maschinenfabrik, Rheinberg, Fed. Rep. of Germany

[21] Appl. No.: 844,656
[22] PCT Filed: Oct. 4, 1990
[86] PCT No.: PCT/SE90/00637
   § 371 Date: May 27, 1992
   § 102(e) Date: May 27, 1992
[87] PCT Pub. No.: WO91/04929
   PCT Pub. Date: Apr. 18, 1991

[30] Foreign Application Priority Data

Oct. 5, 1989 [SE] Sweden .................................. 8903270

[51] Int. Cl.$^5$ .............................................. B65G 53/18
[52] U.S. Cl. .......................................... 406/38; 406/39; 406/146; 406/153; 294/68.23
[58] Field of Search ................... 406/38, 39, 142, 146, 406/153; 294/68.23

[56] References Cited

U.S. PATENT DOCUMENTS

| 2,915,339 | 12/1959 | Lusted | 406/146 X |
| 4,129,329 | 12/1978 | Longo | 294/68.23 |
| 4,385,780 | 5/1983 | Grush | 294/68.23 |
| 4,411,388 | 10/1983 | Muck | 406/153 X |

FOREIGN pATENT DOCUMENTS

| 435203 | 10/1926 | Fed. Rep. of Germany | 294/68.23 |
| 2123249 | 11/1972 | Fed. Rep. of Germany | 406/38 |
| 2346701 | 3/1975 | Fed. Rep. of Germany | 294/68.23 |
| 40977 | 4/1978 | Japan | 406/38 |
| 235126 | 10/1987 | Japan | 406/153 |
| 847495 | 9/1960 | United Kingdom | 294/68.23 |

Primary Examiner—David M. Mitchell
Assistant Examiner—Gary C. Hoge
Attorney, Agent, or Firm—Robert W. & Associates Becker

[57] ABSTRACT

A device for handling bulk material, especially in marine transportation, comprises a pressure vessel having at least two members for mechanically enclosing a volume of the bulk material to be conveyed. The pressure vessel is equipped with pressure fluid activated push rods for moving the two members between an open and closed position to thereby grab a volume of the bulk material. The two members are preferably two essentially identical halves. A supply conduit is connected to the pressure vessel for supplying a pressurized gas thereto. A discharge conduit is connected to the pressure vessel for conveying the volume of bulk material out of the pressure vessel with the aid of the pressurized gas.

19 Claims, 4 Drawing Sheets

DEVICE FOR HANDLING OF BULK MATERIAL

BACKGROUND OF THE INVENTION

The invention concerns a device for the handling of bulk material comprising a pressure vessel with at least two members for mechanically enclosing a volume of bulk material, and a conduit connected to the pressure vessel for supplying a pressurized gas thereto for conveying the enclosed material by way of a discharge conduit.

Bulk material can be of different kinds, and the loading and unloading thereof raises many problems. Some materials such as cement and powdered coal are dust emitting, and other types of material will issue odors.

Mechanical as well as pneumatic conveyors have been proposed, and also combination of such means. When big volumes of material must be handled at a certain place, it is possible to errect a permanent plant with high efficiency.

For applications in which smaller quantities are involved, which are collected or delivered at different places, or handling of bulb material is only occasionally required, a proper device has not been available up to now, which at reasonable installing costs has been able to perform the necessary handling service.

A common field of use for such handling devices is marine transportation, where a ship may have to deliver part of its cargo at different ports, which lack proper handling devices. Other applications enclose or plant, which is serviced occasionally by ships lacking unloading means, but having to deliver some bulk material.

German published document DE-B-1 280 158 discloses a transport container for bulk material, having three separate chambers, each with an inlet opening and an outlet conduit and pneumatic means for promoting discharge of bulk material from the container. Apart from these openings, the container is closed to the atmosphere.

The object of the present invention is to propose a handling device, which is cheap to manufacture, which is mobile, and which in an advantageous manner can handle dust material.

For pneumatic transportation it is advantageous to enclose the material in a pressure vessel, from which it may be blown out. Several ways of filling the pressure vessel as a first step in the handling have been proposed, but have not worked satisfactorily.

SUMMARY OF THE INVENTION

According to the present invention the pressure vessel is designed as a grabbing means in the form of two interconnecting shovel halves, which itself will collect a quantity of material, suitable for the next step of transportation. The device is characterized by that the members are provided with means for moving them between an open and a closed position, for grabbing an amount of bulk material.

The device is further characterized by the two members, respectively, the pressure vessel, being provided with means for moving them between an open and a closed position for grabbing an amount of bulk material. Furthermore, a discharge conduit connected to the pressure vessel for conveying the volume of bulk material out of said pressure vessel by means of the pressurized gas is provided.

At least one of the members of the pressure vessel is then provided with a permeable, gridlike bottom structure and a conduit for the supply of pressurized gas opens below said bottom structure. The two members are substantially identical halves of the pressure vessel, and the device further comprises a yoke to which the halves are pivotably connected. The means for moving the two members between an open and closed position are pressure fluid activated actuators for pivoting the halves relative to the yoke. The pressure vessel thus preferably comprises two substantially similar halves (shovel halves) which are pivotably carried in a yoke and connected to pressure fluid actuators for swinging the halves in relation to the yoke. Advantageously, each one of the halves is provided with a permeable, grid-like bottom structure and has an end plate, the end plates facing away from one another in the closed position of the pressure vessel. The halves, in the closed position, abut at a plan of division of the pressure vessel. The bottom structure is connected to the end plate and extends in a downward direction to the plane of division where the both bottom structures meet. In order to facilitate an emptying, each pressure vessel half is advantageouly provided with a permeable bottom structure pressure vessel will then be tilted which allows the enclosed material to slide towards one end of the pressure vessel.

The discharge conduit includes an extension extending into the pressure vessel, whereby the extension has an opening in the vicinity of one of the bottom structures.

The discharge conduit will then have an internal extension opening at the lower end of the pressure vessel. The yoke with the pressure vessel may hang in a travelling crane movable along the coamings of a cargo hatch opening in a ship.

The pressure vessel may alternatively comprise a grabbing means or shovel member and a lid member adapted to close the same, and be mounted upon a wheeled carriage or vehicle, for instance, a front loader. At least the shovel member is provided with a permeable, grid-like bottom structure, and the supply conduit opens below the bottom structure. The pneumatic transportation part preferably includes a supply conduit with at least one supply branch with an opening inside the pressure vessel, a further branch to a booster valve in the discharge conduit, and a valve means for determining the fluid distribution (fluid flow) between the two branches.

BRIEF DESCRIPTION OF THE DRAWINGS

The invention will below be described with reference to the accompanying drawings, in which.

DESCRIPTION OF PREFERRED EMBODIMENTS

Figure 1:
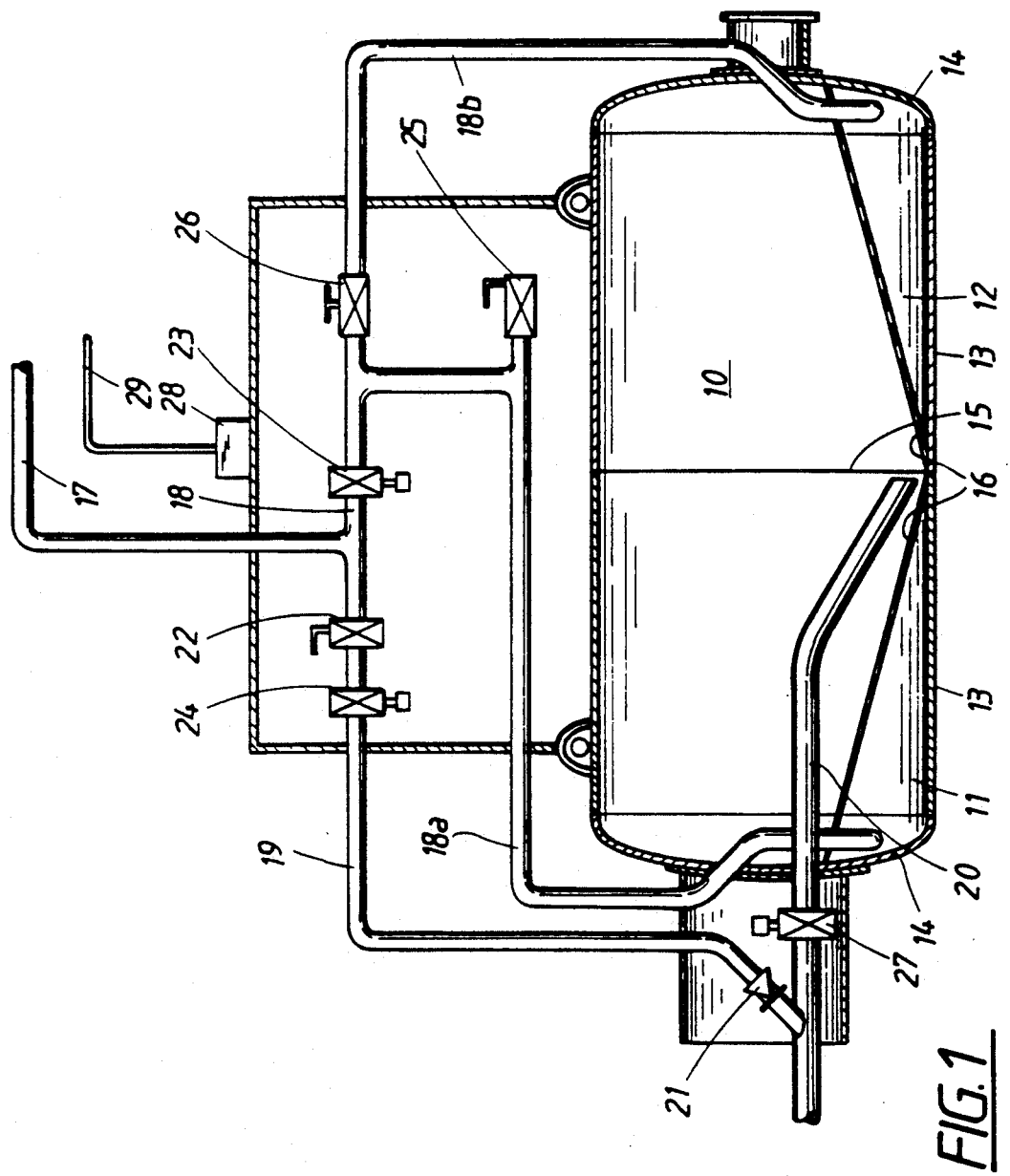
FIG. 1 schematically shows a device according to a first embodiment of the invention, FIG. 2 on a larger scale shows a pressure vessel of the invention.

FIG. 1 very schematically shows the pressure vessel 10 with connected supply and discharge conduits. The vessel comprises, as is better evident from FIG. 2, two substantially similar grabbing members or substantially identical halves 11 and 12, which are pivotably carried by a yoke, not shown in the drawing and may be swung away from each other and then towards each other for grabbing an amount of bulk material, for instance in the cargo hold of a ship. The enclosed bulk material is then blown off pneumatically. It is presupposed that the two members will sealingly engage each other. Each member comprises a cylindrical shell part 13, and a domed end plate 14.

Each grabbing member or half 11, 12 is provided with an inclined, permeable bottom structure 16, which extends from the end plate 14 to the plane of division 15 between the two members. Depending upon the kind of material to be handled, the bottom structure may consist of a gridlike device, or contain parallel rods covered by a wire mesh or fabric.

Compressed air for the pneumatic transportation is supplied by way of a supply conduit 17, which is divided into two branches 18 and 19. The first mentioned one, 18, is further branched into conduits 18a and 18b, which open below the bottom structures 16, and will cause a fluidization of the material whereupon the air will also force the material out by way of the discharge conduit 20. The discharge conduit 20 extends within the pressure vessel 10, to the plane of division 15, down into the angle formed between the meeting bottom structures 16, so that a major part of the enclosed material will be removed during each cycle.

The branch 19 is connected to an ejector 21, which acts as a booster, aiding in forcing the material through the discharge conduit 20.

The compressed air system advantageouly comprises an adjustable valve 22 for determining the fluid distribution between the two branches 18 and 19 Depending upon the kind of material to be handled and the actual length of the discharge conduit, a bigger portion of the compressed air may be alotted to the pressure vessel 10, or to the booster valve 21, respectively.

There are remote-controlled valves 23 and 24, respectively, adapted to open and close branches 18 and 19, and in the first mentioned branch 18 a safety valve 25 is provided. Release of remaining pressure at the end of a working cycle is governed by a valve 26. Also in the discharge conduit 20 there is a remote-controlled valve 27.

Monitoring of the valves occurs in step with the working cycle according to well known techniques, and no detailed description is deemed necessary. It is evident that air should not flow through the vessel when this is open to collect material, therefore sensors indicating that the vessel members 11 and 12 have engaged each other sealingly are provided, so that a supply of compressed air can force the enclosed material out through the discharge conduit 20 when the vessel is closed.

Reference numeral 28 denotes a control box which receives signals from an operator's post by way of a line 29 and governs the valves. The members 11, 12 of the pressure vessel are preferably hydraulically operated, and the box 28 may house an electric motor and a hydraulic pump. On such occasion a conduit for the supply of electric current may run parallel with the line 29.

Figure 2:
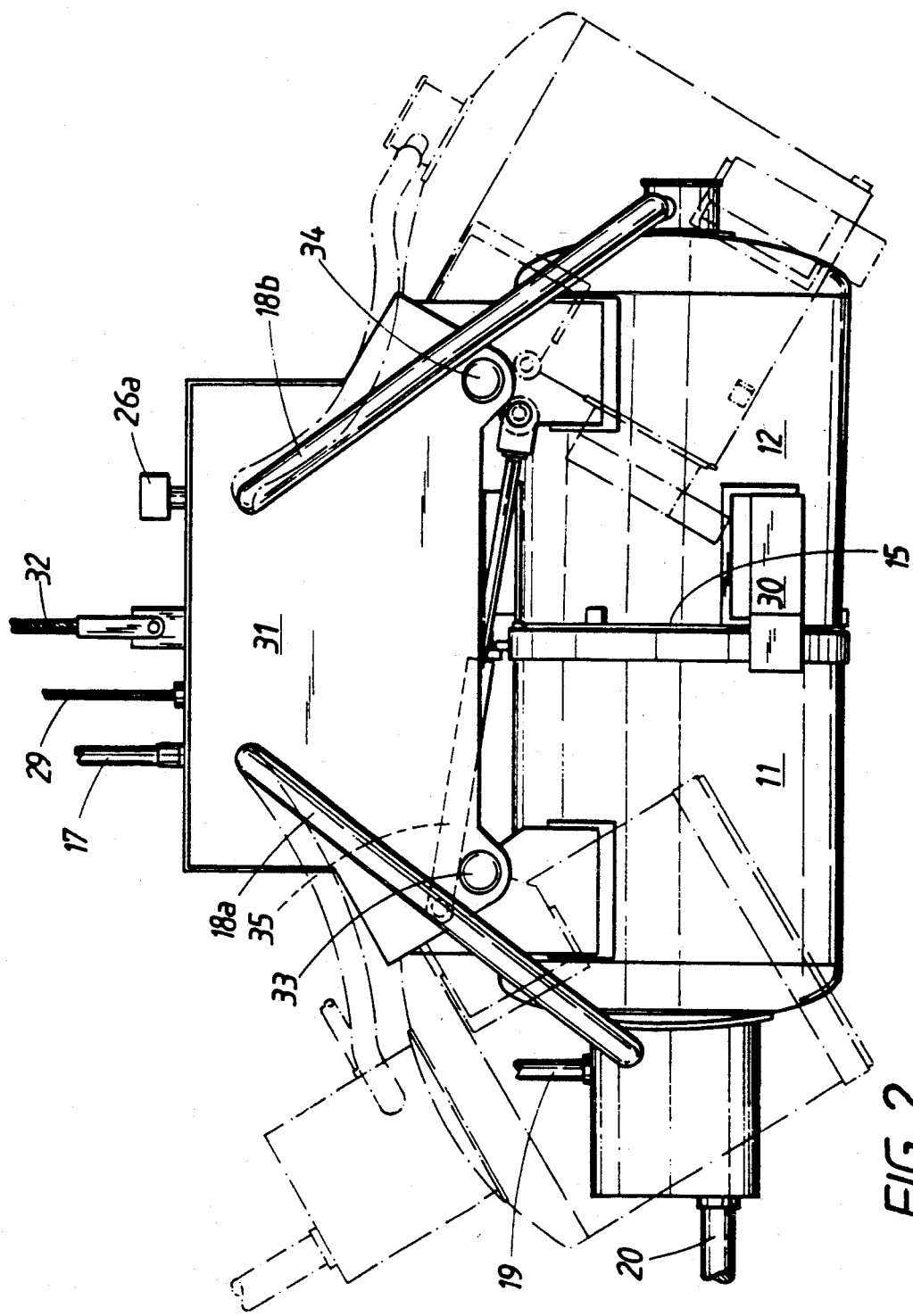

FIG. 2 shows in full lines members 11 and 12 brought into the engaging position for forming a pressure vessel. Suitable packings are provided at the plane of division 15, and during the pneumatic transportation step the members are clamped together by means of remotely controlled locking devices 30.

The members are pivotably carried in a yoke 31, which preferably is designed as a box structure in which valves and operating equipment may be enclosed. The yoke hangs on a cable 32 from a crane or the like, so it can easily be brought into a desired position. The conduit 17 for the supply of compressed air, the signal line 29 and the parallel electric current conduit are connected to the yoke. Reference 26a denotes a cover for the safety valve 26.

The members 11 and 12 are pivotable about trunnions 33 and 34, and may be swung to the position indicated in broken lines by means of pressure fluid activated actuators such as hydraulic rams 35. When the vessel, opened to this position, is lowered into a mound of bulk material, and is then lifted while simultaneouly closing the members, the vessel will bring along a certain portion of the material in the same manner as a common shovel excavator. The design and the equipment at the members will ensure that members in a following step act as a pressure vessel. Of course, this presupposes that the thickness and quality of the plates forming the shell 13 and in the end plate 14 will withstand the actual air pressure.

Figure 3:
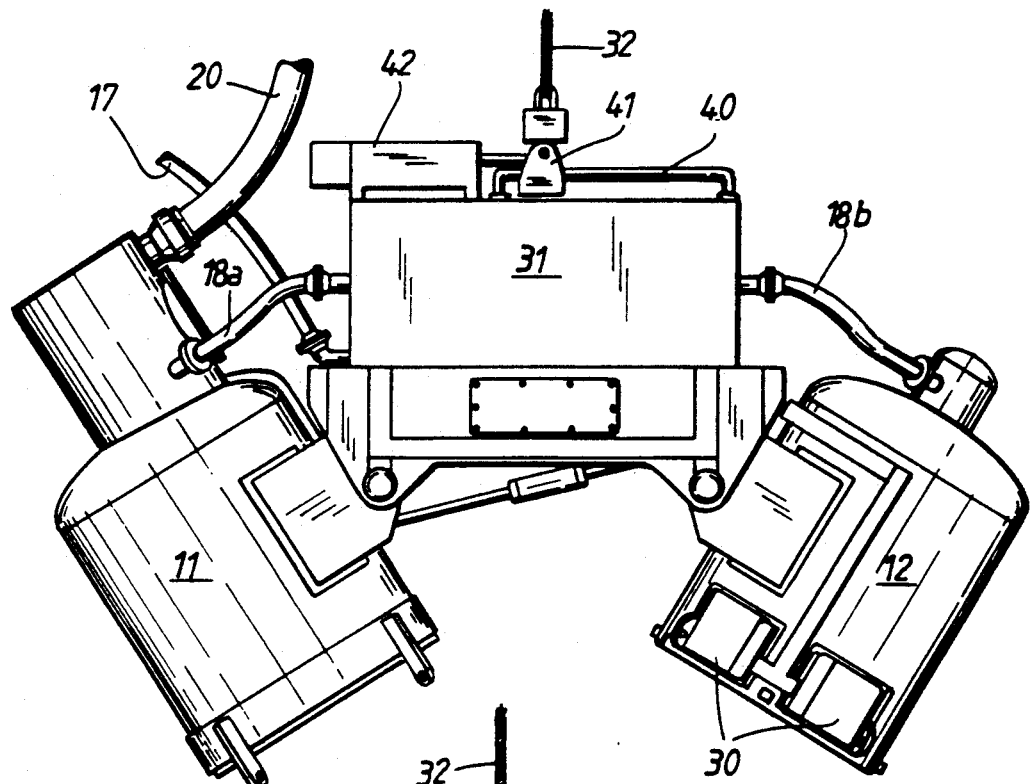
FIG. 3 shows a further embodiment according to the invention.
Figure 4:
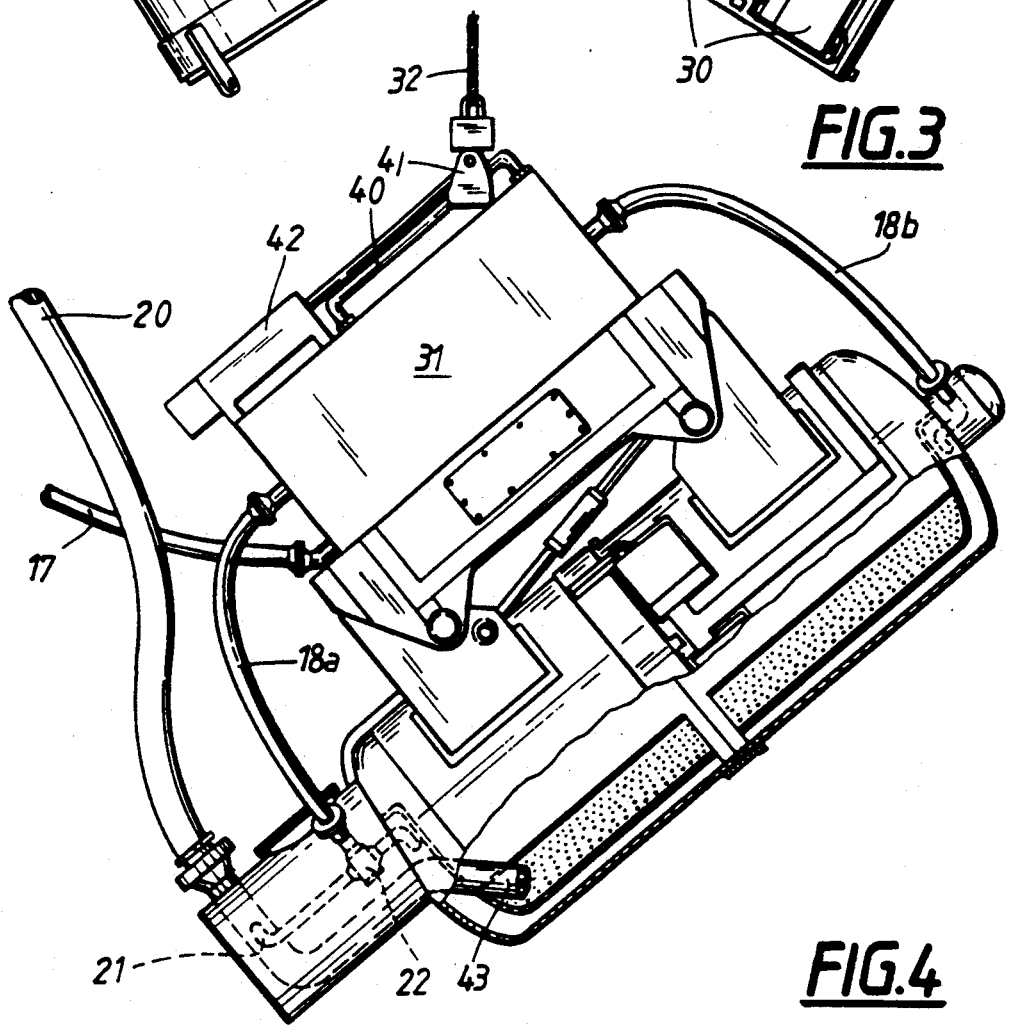
FIG. 4 shows the device according to FIG. 3 in a tilted position, ready for unloading.

FIGS. 3 and 4 show a further embodiment according to the invention, adapted to be tilted during the unloading operation. Whenever possible, the same reference numerals as in FIG. 1 and 2 are used to indicated like parts.

The two pressure vessel halves 11 and 12 are pivotely supported at a yoke 31. Compressed air is supplied by a supply conduit 17 subdivided into two branches 18a, 18b for fluidizing and pressurizing purposes. Branch 18a is further branched off to a booster valve 21 in the discharge conduit 20.

The novel feature here is that the yoke 31 is provided with a bar 40, which during loading operation is horizontal, and has sufficient extension to permit a sliding member 41 connected to the lifting line 32 to be located in the vertical center line of the unit.

A pressure fluid ram 42, controlled in any suitable manner in step with the other actuatable governing devices, will push the sliding member 41 to the right in the drawing, when the two members 11 and 12 have been closed and satisfactorily locked.

The device will then take up the position shown in FIG. 4, where the sliding member 41 is moved well past the vertical center line, and the pressure vessel is tilted such that the end with the discharge conduit is lowered.

This facilitates the sliding of the enclosed material towards the lower end. The permeable bottom structures 16a are formed like bowls and positioned inwardly, a short distance relative to the shell of the pressure vessel.

The extension 43 of the discharge conduit 20 opens just inside the pressure vessel, as the material will slide down towards this end.

A handling device of the kind described above can be mounted permanently in a harbor, but can easily be transported between various places of use, for instance by means of a crane mounted on a truck. A common location will be aboard a ship, where it can be handled by means of existing jibs or cranes. In special bulk transportation ships the equipment can be carried by a travelling crane running along the longitudinal sides of the hatch opening.

Figure 5:
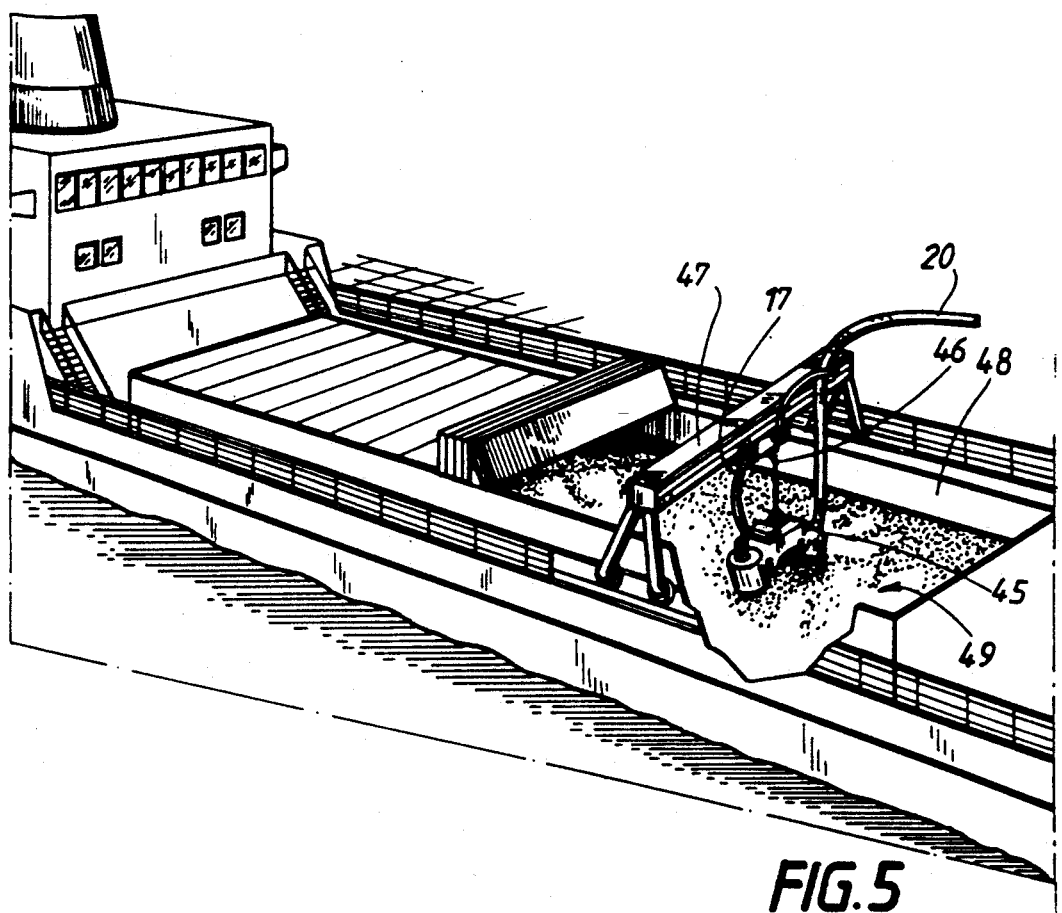
FIG. 5 shows the device mounted on a travelling crane onboard a ship.

FIG. 5 shows an arrangement where a complete unit 45 with yoke, pivotable pressure vessel halves and the necesary moving equipment is hung below a travelling carriage 46 in a portal crane 47, movable along the coamings 48 enclosing a hatch opening 49 in a ship.

The necessary air compressors are mounted on the carriage 46 and supply compressed air by way of supply conduit 17 to unit 45. The discharge conduit, which may be supported in any suitable way, is denoted by reference numeral 20.

Figure 6:
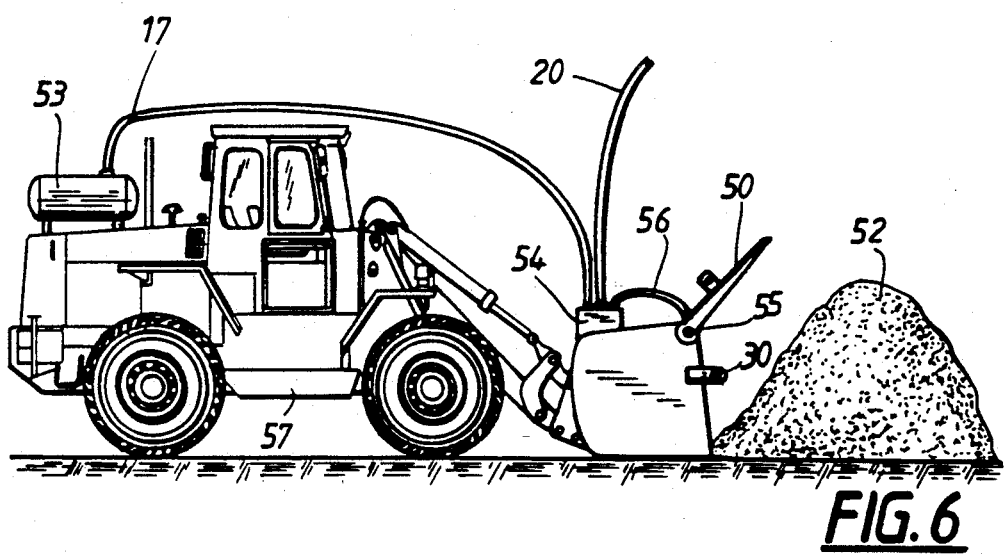
FIG. 6 shows a further embodiment according to the invention, mounted on a truck.

As shown in FIG. 6 a simple transportable unit may consist of a shovel member 11 and a lid member 50 for closing the opening thereof located corresponding to the plane of division 15 in FIG. 2. The vessel is mounted upon a vehicle 51 of the front loader type, which with the lid open collects material from a mound 52. When the vehicle has backed away and the lid 50 has closed the vessel, the vessel is ready for the pneumatic transportation step.

The necessary compressor 53 is mounted upon the vehicle, and supplies compressed air by way of conduit 17. A box 54 containing the necessary valving and hydraulic equipment is mounted upon member 11.

The lid member 50 may be pivoted by means of a power hinge 55, which is supplied with pressure fluid by way of a conduit 56.

The devices described above and shown in the drawings are examples of the invention only, and the details thereof may be varied in many ways within the scope of the appended claims. As bulk material is in the fist hand solid granules or dustlike substances considered, but the device may also be used for the handling of liquid or wet substances. When dredging the apparatus may remain submerged, opening and closing below water level, and the silt being ejected pneumatically.

The present invention is, of course, in no way restricted to the specific disclosure of the specification and drawings, but also encompasses any modifications within the scope of the appended claims.

What I claim is:

1. A device for handling bulk material, comprising:
   a pressure vessel having at least two members for mechanically enclosing a volume of the bulk material;
   a means connected to said pressure vessel for moving said two members between an open and closed position to thereby grab the volume of the bulk material;
   a supply conduit connected to said pressure vessel for supplying a pressurized gas thereto; and
   a discharge conduit connected to said pressure vessel for conveying the volume of bulk material out of said pressure vessel by means of the pressurized gas.

2. A device according to claim 1, wherein at least one of said members is provided with a permeable, grid-like bottom structure, and wherein said supply conduit opens below said bottom structure.

3. A device according to claim 2, wherein said members are substantially identical halves of said pressure vessel, said device further comprising a yoke, with said halves being pivotably connected to said yoke, and wherein said means for moving said two members between an open and closed position are pressure fluid activated actuators for pivoting said halves relative to said yoke.

4. A device according to claim 3, wherein each said halves is provided with a permeable, grid-like bottom structure and has an end plate, said end plates of said halves facing away from one another in said closed position of said pressure vessel, said halves, in said closed position, abutting at a plane of division of said pressure vessel, said bottom structure being connected to said end plate and extending in a downward direction to said plane of division where said bottom structures meet.

5. A device according to claim 4, wherein said yoke further comprises means for connecting said yoke to a lifting device.

6. A device according to claim 5, wherein said means of connected said yoke to the lifting device comprises a sliding member and a means for transferring a point of attachment to the lifting device past a vertical center line of said pressure vessel.

7. A device according to claim 6, wherein said discharge conduit includes an extension extending into said pressure vessel, said extension having an opening in the vicinity of one of said bottom structures.

8. A device according to claim 6, wherein said discharge conduit includes an extension extending into said pressure vessel, said extension having an opening in the vicinity of said plane of division.

9. A device according to claim 5 for use aboard a ship, wherein said lifting device is a travelling crane movable along coamings of a cargo opening of the ship.

10. A device according to claim 1, wherein said members are a shovel member and a lid member mounted on a wheeled carriage.

11. A device according to claim 10, wherein at least said shovel member is provided with a permeable, grid-like bottom structure, and wherein said supply conduit opens below said bottom structure.

12. A device according to claim 1, wherein said supply conduit comprises: at least one supply branch with an opening inside said pressure vessel, a further branch, and a valve means for distributing a fluid flow between said supply branch and said further branch, and wherein said discharge conduit comprising a booster valve connected to said further branch.

13. A device according to claim 1, wherein said members are substantially identical halves of said pressure vessel, said device further comprising a yoke, said halves being pivotably connected to said yoke, and wherein said means for moving said two members between an open and closed position are pressure fluid activated actuators for pivoting said halves relative to said yoke.

14. A device according to claim 13, wherein each said halves is provided with a permeable, grid-like bottom structure and has an end plate, said end plates of said halves facing away from one another in said closed position of said pressure vessel, said halves, in said closed position, abutting at a plane of division of said pressure vessel, said bottom structure being connected to said end plate and extending in a downward direction to said plane of division where said bottom structures meet.

15. A device according to claim 14, wherein said yoke further comprises means for connecting said yoke to a lifting device.

16. A device according to claim 15, wherein said means of connecting said yoke to the lifting device comprises a sliding member and a means for transferring a connecting point to the lifting device past a vertical center line of said pressure vessel.

17. A device according to claim 16, wherein said discharge conduit includes an extension extending into said pressure vessel, said extension having an opening in the vicinity of one of said bottom structures.

18. A device according to claim 16, wherein said discharge conduit includes an extension extending into said pressure vessel, said extension having an opening in the vicinity of said plane of division.

19. A device according to claim 15 for use aboard a ship, wherein said lifting device is a travelling crane movable along coamings of a cargo opening of the ship.

* * * * *

UNITED STATES PATENT AND TRADEMARK OFFICE
CERTIFICATE OF CORRECTION

PATENT NO. : 5,238,332
DATED : August 24, 1993
INVENTOR(S) : Mansson

It is certified that error appears in the above-identified patent and that said Letters Patent is hereby corrected as shown below:

On the title page:

[73] Assignee: Hägglund MTT AS, Bergen, Norway

Signed and Sealed this

Third Day of May, 1994

Attest:

BRUCE LEHMAN

Attesting Officer  Commissioner of Patents and Trademarks